United States Patent [19]

Chiba

[11] Patent Number: 5,857,010
[45] Date of Patent: Jan. 5, 1999

[54] POWER-FAILURE RESISTANT COMMUNICATION SYSTEM

[75] Inventor: Yukio Chiba, Kawasaki, Japan

[73] Assignee: Canon Kabushiki Kaisha, Tokyo, Japan

[21] Appl. No.: 947,054

[22] Filed: Oct. 8, 1997

Related U.S. Application Data

[63] Continuation of Ser. No. 460,995, Jun. 5, 1995.

[30] Foreign Application Priority Data

Jun. 7, 1994 [JP] Japan .................................. 6-148684
Mar. 20, 1995 [JP] Japan .................................. 7-087645

[51] Int. Cl.⁶ .......................... H04M 1/24; H04M 3/22; H04M 1/00
[52] U.S. Cl. ............................. 379/32; 379/1; 379/2; 379/8; 379/164; 455/564; 455/565; 455/572
[58] Field of Search ................................ 379/1, 2, 3, 32, 379/8, 93, 164, 201, 279, 355, 377, 379, 387; 455/561, 564, 565, 572

[56] References Cited

U.S. PATENT DOCUMENTS

| | | | |
|---|---|---|---|
| 4,012,601 | 3/1977 | Kehren | 379/355 |
| 4,187,414 | 2/1980 | Fahrenschon | 379/8 |
| 4,232,199 | 11/1980 | Boalwright | 379/201 |
| 4,381,427 | 4/1983 | Cheal | 379/93 |
| 4,564,724 | 1/1986 | Nakayama | 379/164 |
| 4,853,949 | 8/1989 | Schorr | 379/2 |
| 4,972,452 | 11/1990 | Chack | 379/32 |
| 5,216,704 | 6/1993 | Williams | 379/387 |

FOREIGN PATENT DOCUMENTS

| | | |
|---|---|---|
| 0 443 583 A2 | 8/1991 | European Pat. Off. . |
| 0103896 | 6/1985 | Japan ................................ 379/379 |
| 23496 | 6/1986 | Japan . |
| 121594 | 9/1986 | Japan . |
| 63-60690 | 3/1988 | Japan . |
| 2-55496 | 2/1990 | Japan . |
| 4-271697 | 9/1992 | Japan . |

OTHER PUBLICATIONS

Examiner's Office Action Letter (translation) dated Feb. 6, 1998 for corresponding Japanese application.

*Primary Examiner*—Vijay Shankar
*Attorney, Agent, or Firm*—Morgan & Finnegan LLP

[57] ABSTRACT

A communication system for connecting a terminal through a communication channel for a communication signal and a control channel for the control signal is constructed by a decoder for decoding a dial signal such as a push button signal that is generated from the terminal, a transmitting unit for transmitting a dial signal according to an output of the decoder to an external line at the time of a current supply, a power supply unit for supplying a current to a dial signal generator provided for the terminal when the terminal is in an off-hook state, and a setting unit for setting control data for the communication system in accordance with the output of the decoder, wherein when a power failure occurs, the dial signal that is generated from the terminal is transmitted to the external line without passing through the decoder.

34 Claims, 14 Drawing Sheets

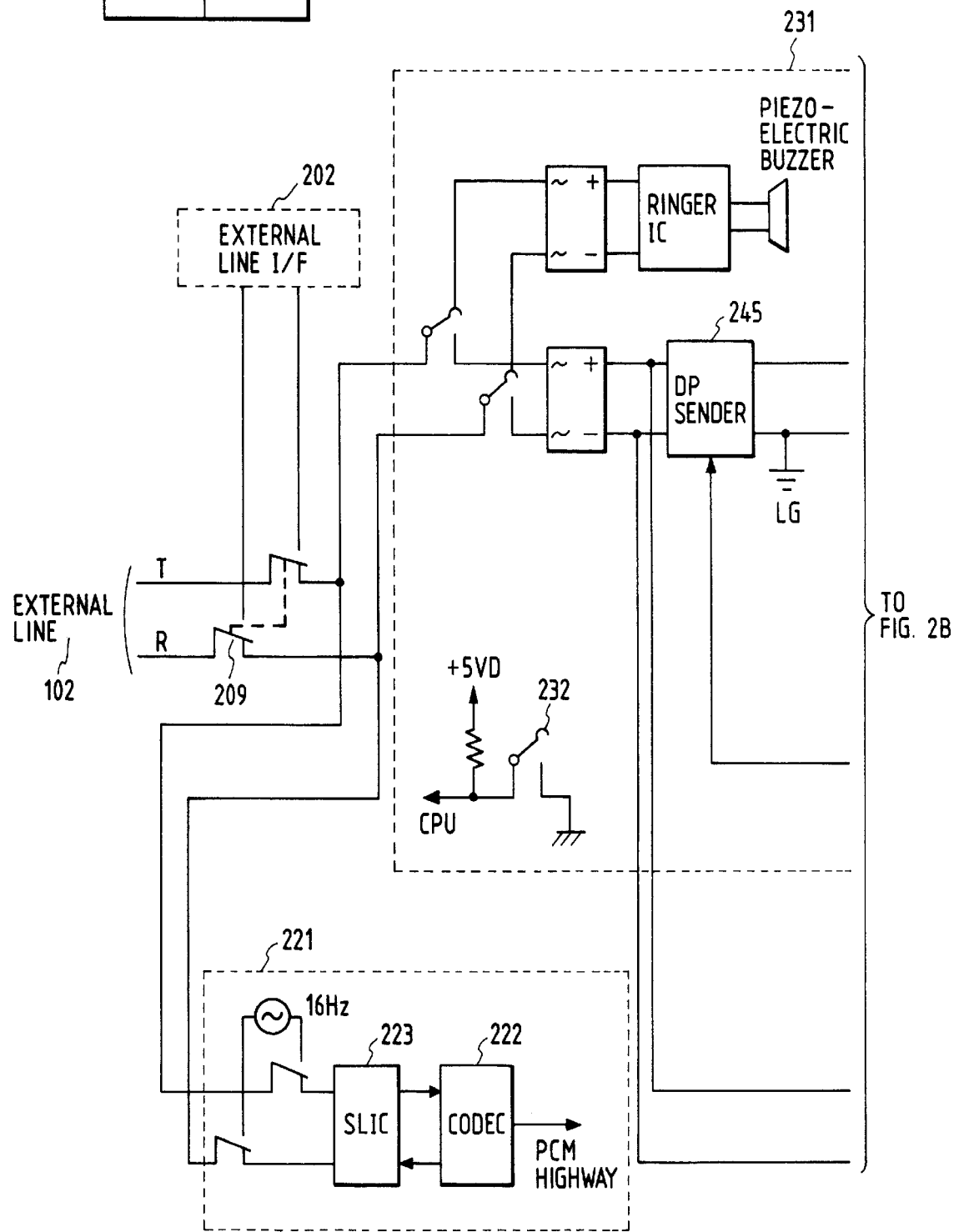

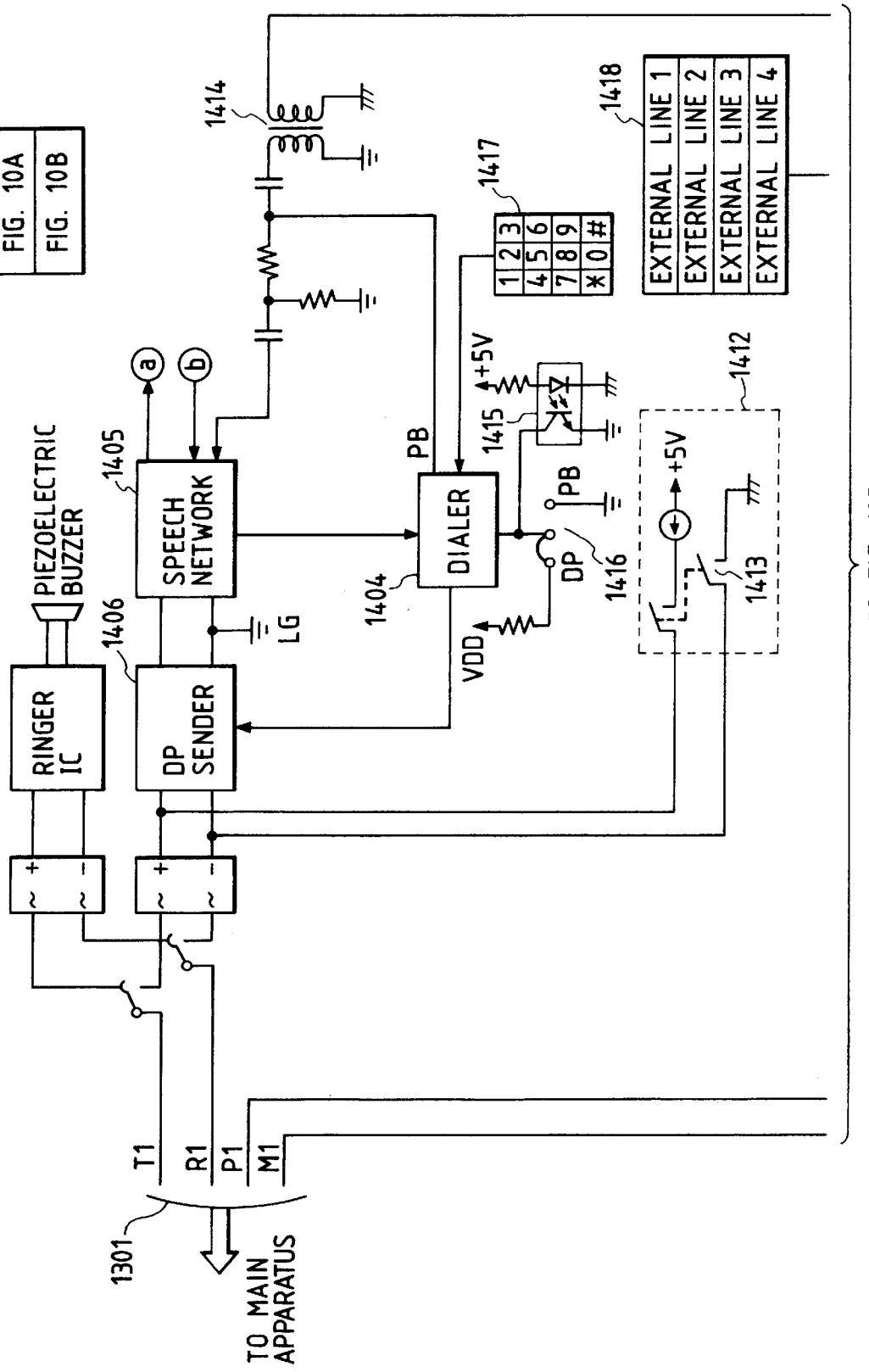

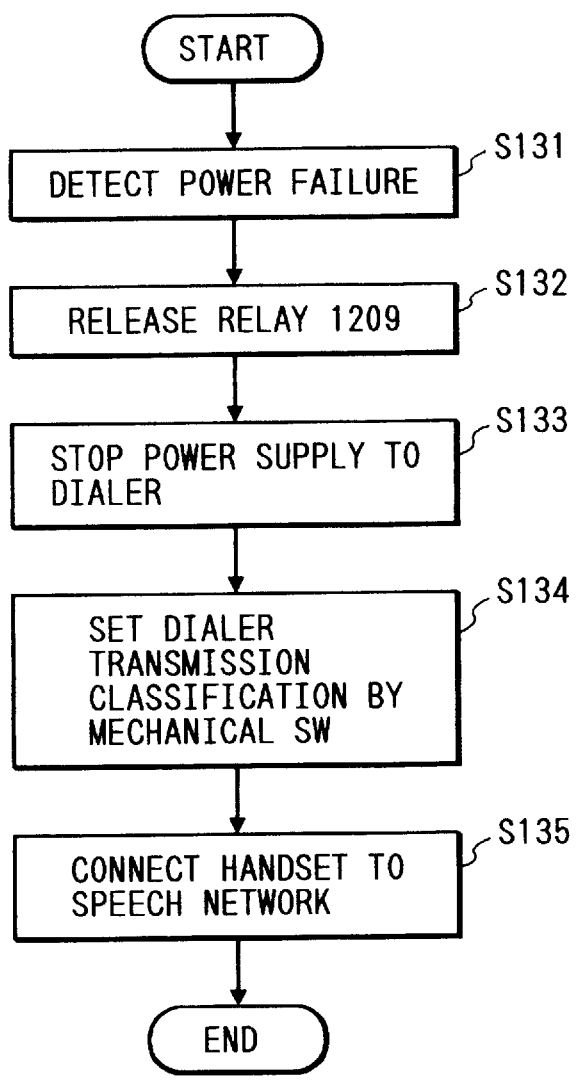

5,857,010

POWER-FAILURE RESISTANT COMMUNICATION SYSTEM

This is a continuation of co-pending application Ser. No. 08/460,995, filed on Jun. 5, 1995.

BACKGROUND OF THE INVENTION

1. Field of the Invention

The invention relates to a communication system which can communicate even at the time of a power failure.

2. Related Background Art

Hitherto, there is a communication system in which a circuit of a single telephone is provided in an exclusive-use telephone which is connected to a main apparatus by a wire and, when a power failure occurs, such a circuit is directly connected to an external line, thereby enabling a transmission and a reception to be executed in only such an exclusive-use telephone. In case of using the above construction, the communication system can be cheaply realized as compared with a construction such that the whole system is operated by a power source for a power failure.

A dial button of the exclusive-use telephone corresponding to a power failure having therein the circuit of the single telephone needs two circuits of a signal line to scan from a CPU at the time of a current supply and a signal line to scan from a dialer (or a dialer IC) at the time of a power failure.

With respect to such two circuits of the signal lines for scanning the dial button at the time of the current supply and the power failure, it is necessary to assure an insulation state so as to prevent that the system is broken by an induction lightning from the external line. A printed circuit board and a switch part to realize such two circuits of the signal lines for scanning are expensive.

SUMMARY OF THE INVENTION

It is an object of the invention to improve a system which can communicate even at a power failure.

Another object of the invention is to enable a communication at the time of a power failure to be executed by using a dial key of one contact.

Still another object of the invention is to enable control data to be set by using a terminal which can also communicate even at the time of a power failure.

Further another object of the invention is to realize a communication at the time of a power failure by using a dial key of one contact, a dialer which can generate both of a push button (PB) signal and a dial pulse signal, and a PB receiver.

The above and other objects and features of the present invention will become apparent from the following detailed description and the appended claims with reference to the accompanying drawings.

BRIEF DESCRIPTION OF THE DRAWINGS

FIG. 13 is a flowchart showing the operations of the main apparatus and the exclusive-use telephone corresponding to the power failure when a power failure occurs in the second embodiment.

DETAILED DESCRIPTION OF THE PREFERRED EMBODIMENTS

Figure 1:
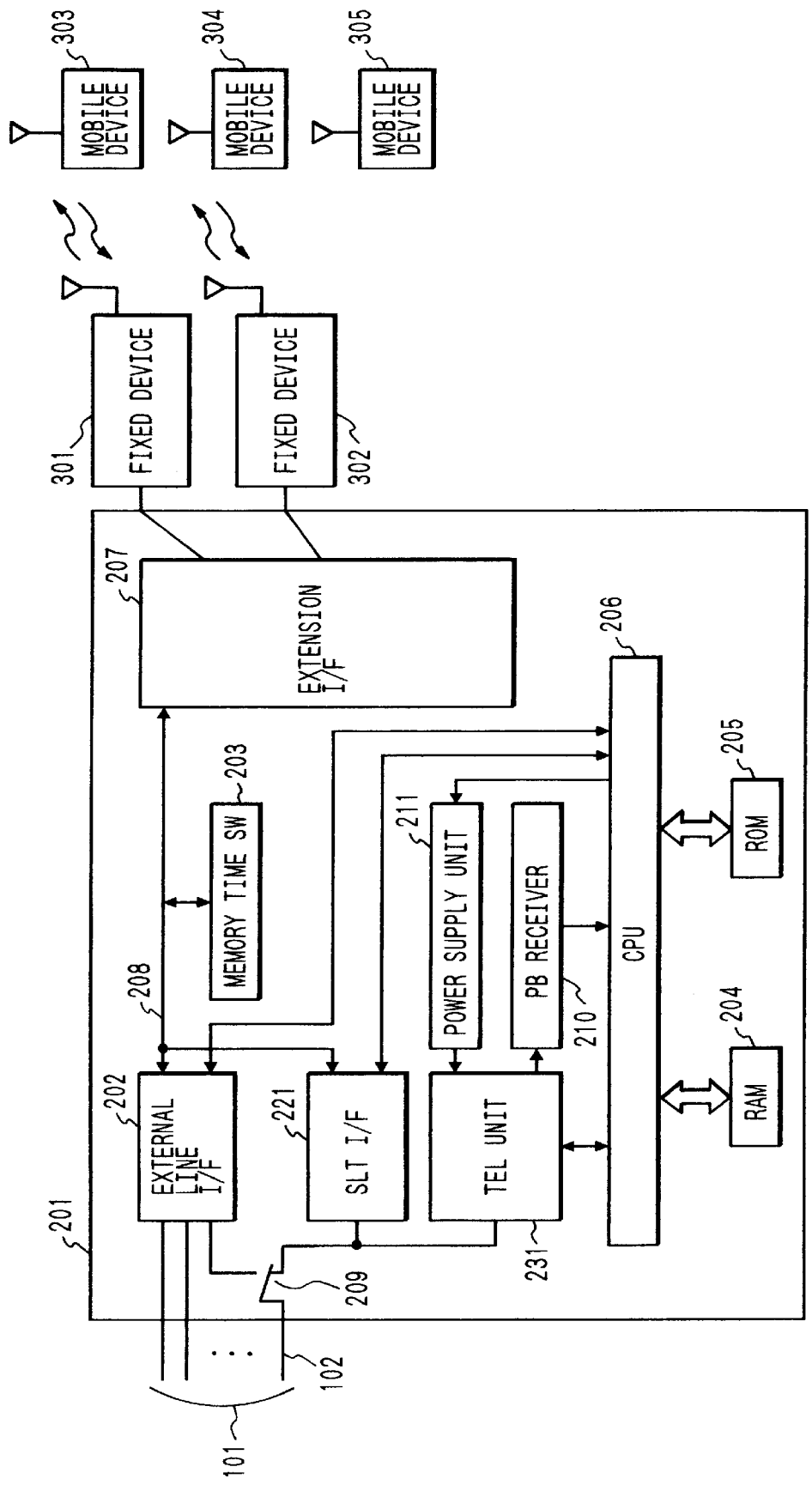
FIG. 1 is a block diagram showing a construction of a telephone exchange in the first embodiment of the invention.

FIG. 1 is a block diagram showing a construction of a telephone exchange in the first embodiment of the invention.

The telephone exchange is constructed by: a main apparatus 201 which encloses a plurality of external lines 101 such as local lines, external lines, extensions of a PBX, and the like and has an exchange unit; fixed devices 301 and 302 which are connected to the extensions by wires; and mobile devices 303, 304, and 305 which are connected to the extensions through the fixed devices 301 and 302 in a wireless manner.

The main apparatus 201 of the telephone exchange has: an external line interface 202; an extension interface 207; a high speed signal line PCM highway 208 for a digital encoded audio signal; a memory time switch 203 for exchanging and connecting the digital encoded audio signal; an RAM 204 as a readable and writable memory device; an ROM 205 as a read only memory device; a CPU 206 for controlling the operation of the whole telephone exchange; an interface 221 for a single line telephone (SLT); a single line telephone unit 231 of an extension corresponding to a power failure which receives a current from the SLT interface 221 and functions as an extension single line telephone at the time of a current supply and which is directly coupled to an external line 102 and functions as a single line telephone for a power failure at the time of a power failure; a power supply unit 211 for supplying an electric power to the telephone unit 231 by a control of the CPU 206; a PB receiver 210 for receiving a PB dial signal from the telephone unit 231 and decoding a dial number; and a relay 209 for connecting the external line 102 to the external line interface 202 at the time of a current supply and for connecting the external line 102 to the telephone unit 231 at the time of a power failure.

Figure 2B:
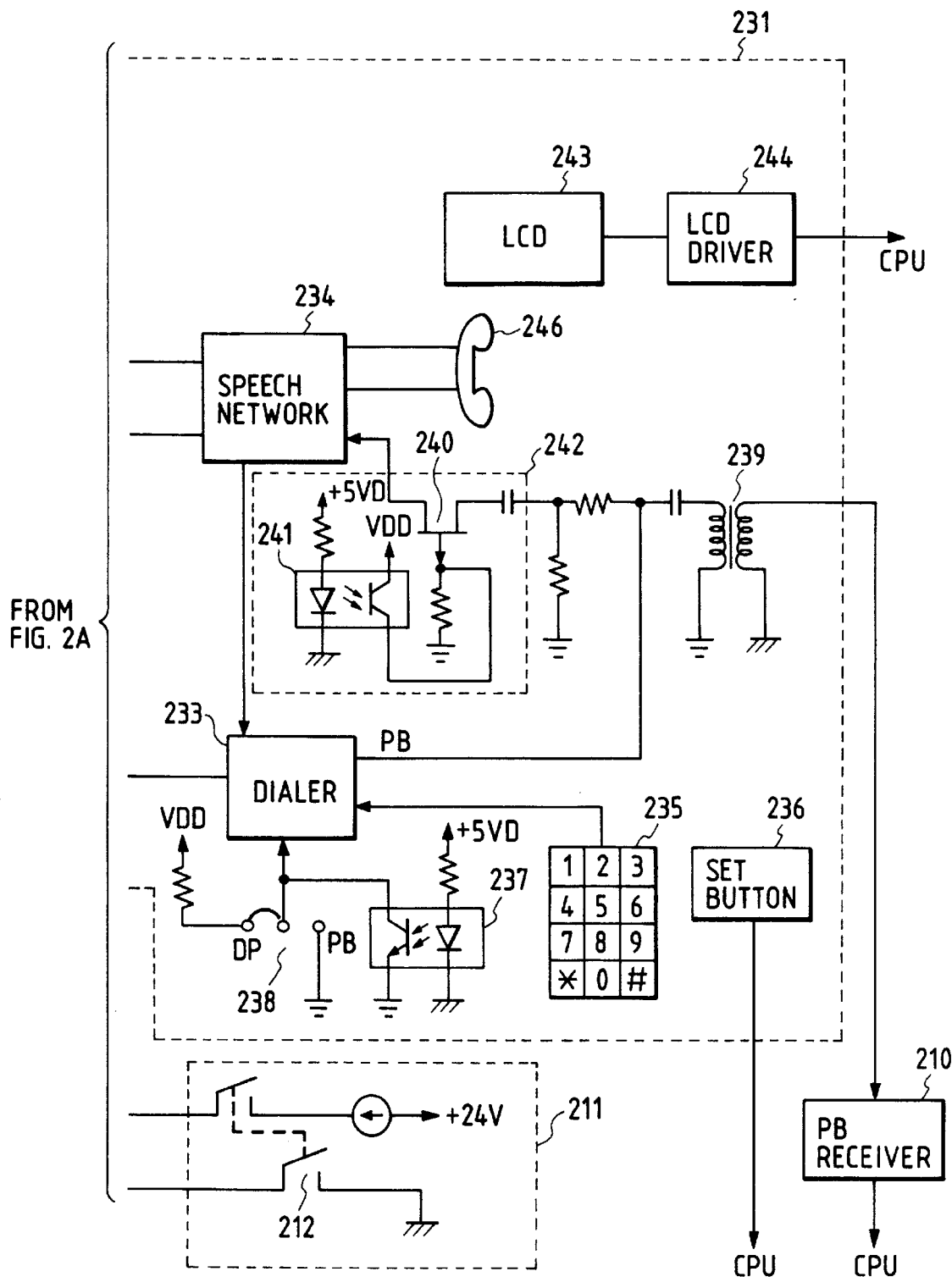
FIG. 2 which is comprised of FIGS. 2A and 2B is a block diagram showing in detail a construction of a single line telephone (SLT) unit of an extension corresponding to a power failure, an SLT interface, and a power supply unit in the first embodiment.

FIGS. 2A and 2B are block diagrams showing in detail a construction of the telephone unit 231, SLT interface 221, and power supply unit 211 shown in FIG. 1.

The telephone unit 231 has: a dial button 235 of one contact; a dialer (a dialer IC) 233 for generating a selection signal due to a PB dial signal or DP dial signal in accordance with a depression of the dial button 235; a speech network (a speech network IC) 234 for closing a direct current (DC) from the external line 102 and for controlling a transmission and reception of an audio signal; a mechanical switch 238 for setting a generation signal classification of the dialer 233 upon power failure; a photocoupler 237 for setting the generation signal classification of the dialer 233 to a PB dial irrespective of a state of the mechanical switch 238; a handset 246 for a speech; a hook detection circuit 232 for detecting an on-hook or off-hook of the handset 246 and notifying to the CPU 206; a set button 236 for allowing the dialer 233 to start a power supply from the power supply unit 211 when the handset 246 is on-hooked, thereby enabling system data of the telephone exchange or the like to be set by the dial button; an input blocking circuit 242, constructed by an FET 240 and a photocoupler 241, for blocking that the PB dial signal that is transmitted from the dialer 233 is inputted to the speech network 234; a transformer 239 to transmit the PB dial signal while keeping an insulation between the telephone unit 231 and the PB receiver; a DP sender 245 which is controlled by the dialer 233 and sends a dial pulse to the external line 102; a liquid crystal display (LCD) 243 for displaying set information such as system data and the like of the telephone exchange by the control of the CPU 206, thereby improving an operability; and an LCD driver 244.

The SLT interface 221 has: an SLIC 223 for supplying a DC signal multiplexed with an audio signal to the telephone unit 231; a CODEC 222 for encoding and decoding the audio signal that is transmitted and received to/from the telephone unit 231 through the PCM highway 208; and a call signal source for ringing a ringer IC of the telephone unit 231 at the time of reception.

The power supply unit 211 further has a relay 212 for supplying a current to the dialer 233 under the control of the CPU 206.

Figure 3:
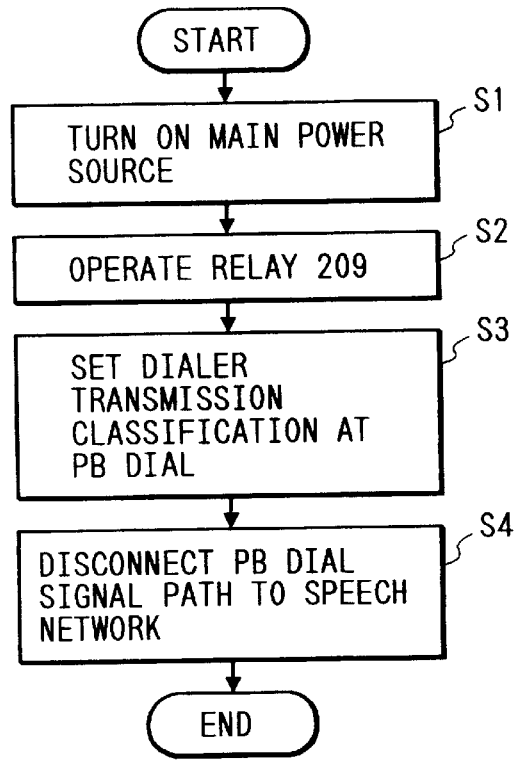
FIG. 3 is a flowchart showing the operation of a main apparatus at the time of a turn-on of a main power source in the first embodiment.

FIG. 3 is a flowchart showing the operation of the main apparatus 201 when a main power source of the telephone exchange is turned on.

When the main power source is turned on (S1), a current flows to a coil of the relay 209 and the contact operates (S2). The external line 102 is connected to the external line interface 202. By the turn-on of the main power source, +5 VD shown in the telephone unit 231 in FIGS. 2A and 2B is supplied and the photosensing side of the photocoupler 237 is made conductive. Thus, the generation signal classification of the dialer 233 is set to the PB dial irrespective of a state of the mechanical switch 238 to set the generation signal classification of the dialer 233 upon power failure (S3).

Further, the photosensing side of the photocoupler 241 is also made conductive and a power source VDD to the dialer 233 is connected to a gate terminal of the FET 240. In this state, when the power source VDD is supplied, the FET 240 is turned off, thereby blocking that the PB dial signal which is transmitted from the dialer 233 is inputted to the speech network 234 (S4).

Figure 4:
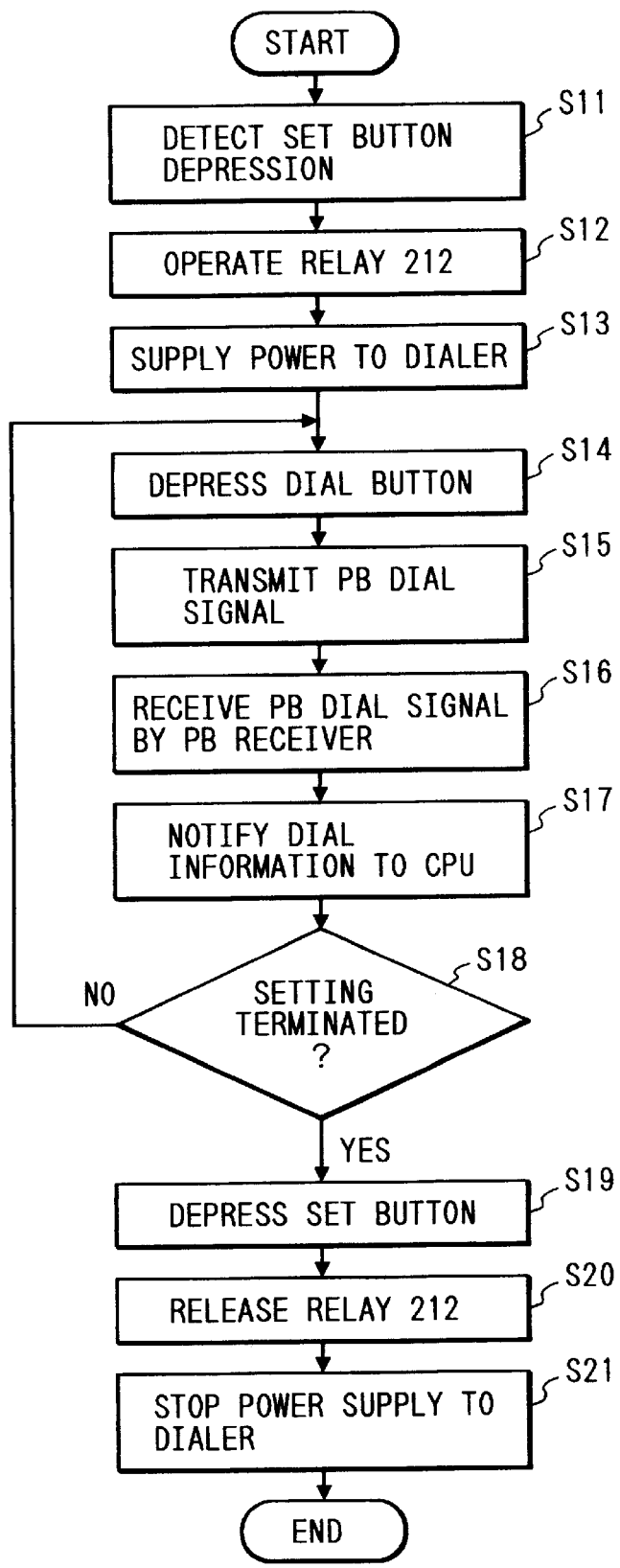
FIG. 4 is a flowchart showing the operation when executing a setting of system data or the like by using a telephone unit at the time of a current supply in the first embodiment.

FIG. 4 is a flowchart showing the operation when setting the system data or the like of the telephone exchange by using the telephone unit 231 upon current supply.

When the CPU 206 detects the depression of the set button 236 by the operator (S11), the CPU 206 makes the relay 212 of the power supply unit 211 operative (S12). The power supply to the dialer 233 through the speech network 234 is started (S13).

When the operator depresses the dial button 235 to set (S14), a PB dial signal is transmitted from the dialer 233 (S15) and is received by the PB receiver 210 through the transformer 239 (S16). The PB receiver 210 decodes the dial number depressed by the operator from the PB dial signal and notifies to the CPU 206 (S17).

The CPU 206 sets the system data or the like of the telephone exchange by the dial number information and stores into the RAM 204. The kind of external line and the like are included in the system data. When the above setting is finished (S18), the operator again depresses the set button 236 (S19), so that the relay 212 is released (S20) and the power supply to the dialer 233 is stopped (S21).

Figure 5:
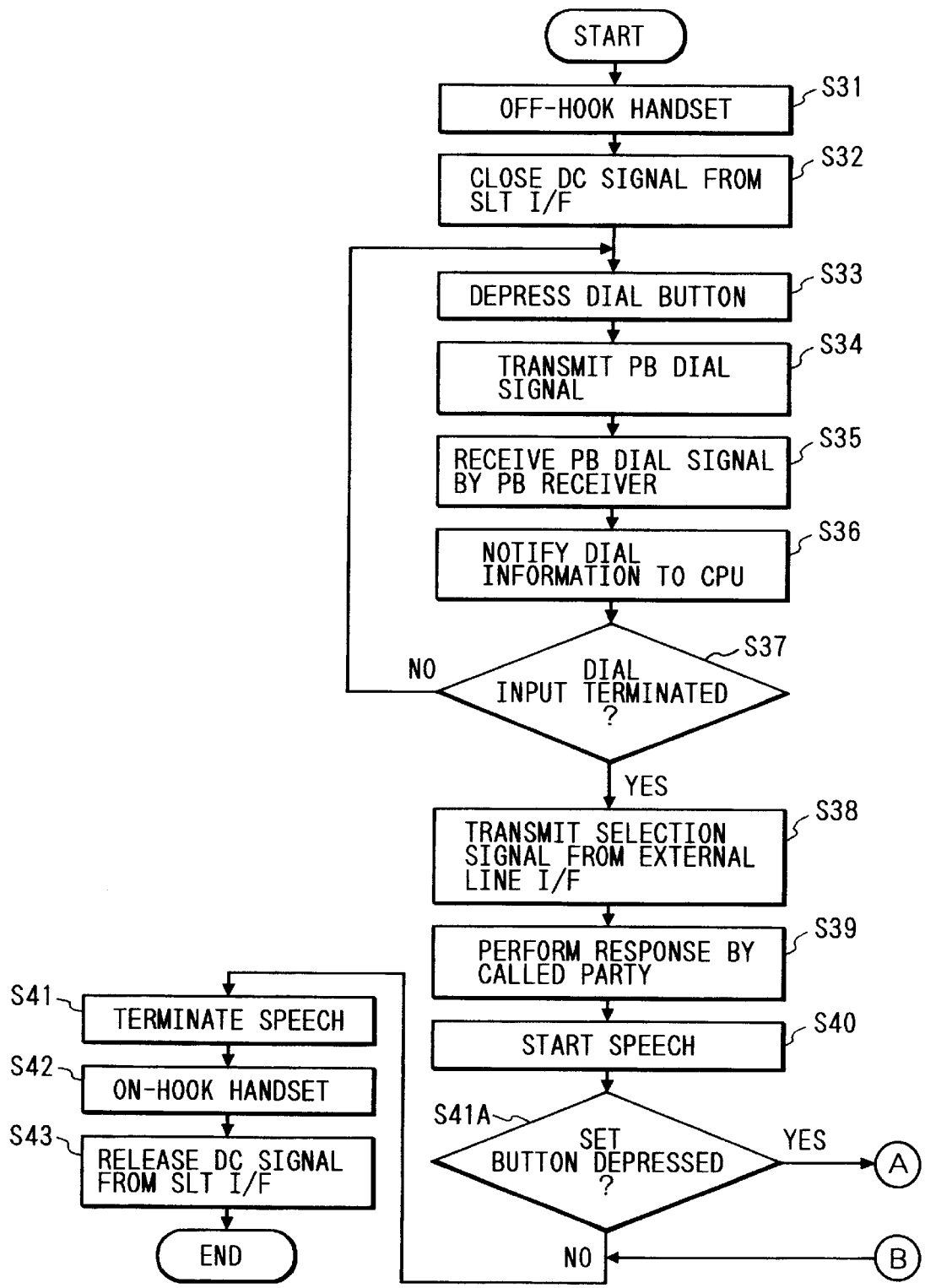
FIG. 5 is a flowchart showing a dial transmitting operation of the telephone unit at the time of a current supply in the first embodiment.

FIG. 5 is a flowchart showing the operation of a dial transmission of the telephone unit 231 at the time of a current supply.

When the operator off-hooks the handset 246 (S31), a DC signal from the SLT interface 221 is closed by the speech network 234 (S32) and a current is supplied to the dialer 233.

When the operator subsequently depresses the dial button 235 (S33), the PB dial signal is transmitted from the dialer 233 (S34) and is received by the PB receiver 210 through the transformer 239 (S35). In this instance, since the FET 240 is off, it is blocked that the PB dial signal generated from the dialer 233 is inputted to the speech network 234, so that the PB signal is not transmitted to the SLT interface 221.

The PB receiver 210 decodes the dial number depressed by the operator from the PB dial signal and notifies to the CPU 206 (S36). When the dial number input by the operator as mentioned above is finished (S37), the dial number is notified from the CPU 206 to the external line interface 202 and a selection signal is sent from the external line interface 202 to the external lines 101 (S38). The external line interface 202 has a circuit to transmit a dial pulse or a PB signal to the external line 102. Information indicating whether the dial pulse is transmitted or the PB signal is transmitted has previously been registered in the RAM 204.

After that, by a response of a called party (S39), the telephone unit 231 is connected to the called party through the SLT interface 221, PCM highway 208, and memory time switch 203 and the system is shifted to a speech state (S40). When the speech is finished (S41), by on-hooking the handset 246 by the operator (S42), the DC signal from the SLT interface 221 is released (S43). Upon current supply, an extension speech can be also performed from the telephone unit 231.

Figure 6:
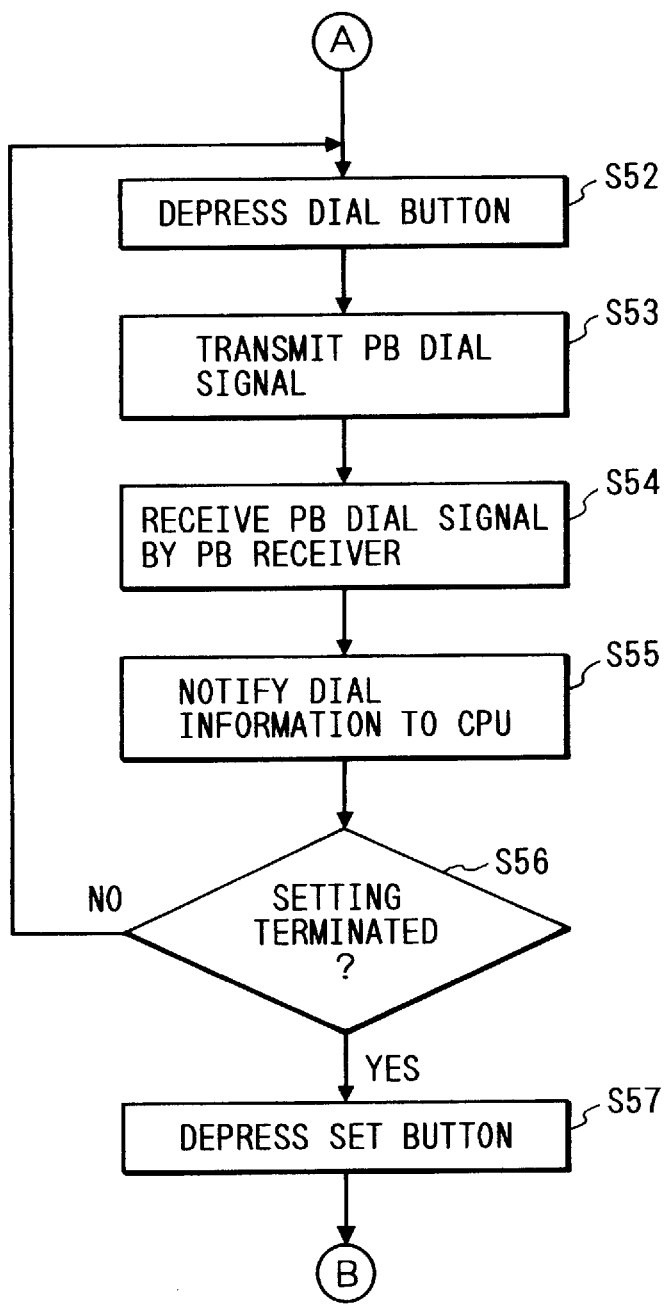
FIG. 6 is a flowchart showing the operation when setting system data or the like by using the telephone unit at the time of a current supply in the first embodiment.

FIG. 6 is a flowchart showing the operation for setting the system data or the like of the telephone exchange by using the telephone unit 231 in speech at the time of the current supply.

During the speech (S40) using the telephone unit 231 at the time of the current supply in FIG. 5, when the set button 236 to start the setting is depressed (S41A), the processing routine is branched to (A) in FIG. 6.

When the CPU 206 detects the depression of the set button 236 by the operator, the CPU 206 waits for the input of a dial signal to set. When the operator subsequently depresses the dial button 235 to set (S52), the PB dial signal is transmitted from the dialer 233 (S53) and is received by the PB receiver 210 through the transformer 239 (S54).

The PB receiver 210 decodes the dial button depressed by the operator from the PB dial signal and notifies to the CPU 206 (S55). The CPU 206 sets the system data or the like of the telephone exchange by the dial number information and stores into the RAM 204. The kinds (line for the PB signal, the line for the dial pulse, etc.) of external lines are included in the system data.

When the setting is finished (S56), the operator again depresses the set button 236 (S57), thereby branching the processing routine to step S41 in FIG. 5.

Since the FET 240 is off during the current supply, it is blocked that the PB dial signal which is generated from the dialer 233 is inputted to the speech network 234. The PB dial signal is not transmitted to the SLT interface 221. Therefore, the PB dial signal is not heard by the called party.

Figure 7:
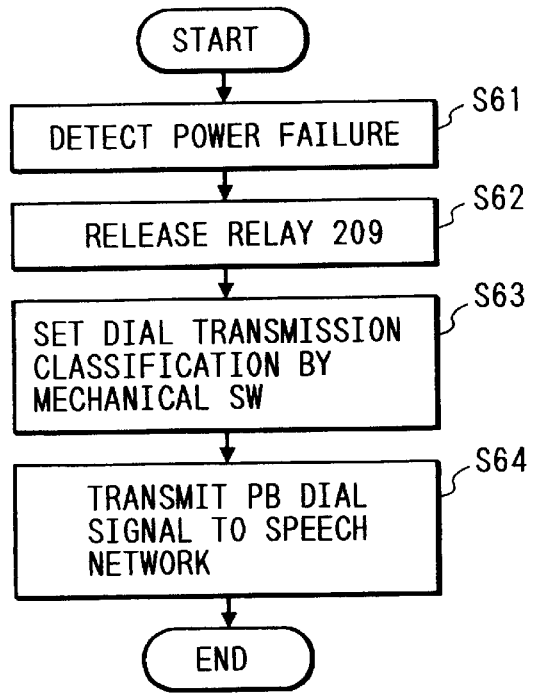
FIG. 7 is a flowchart showing the operation of the main apparatus when a power failure occurs and a power supply to the telephone exchange is disconnected in the first embodiment.

FIG. 7 is a flowchart showing the operation of the main apparatus 201 when a power failure occurs and the power source to the telephone exchange is disconnected.

When the power source is shut off (S61), the relay 209 is released (S62) and the external line 102 is connected to the telephone unit 231. Since +5 VD shown in the telephone unit 231 in FIGS. 2A and 2B is not supplied, the photosensing side of the photocoupler 237 is made nonconductive. Therefore, the generation signal classification of the dialer 233 is set by the mechanical switch 238 to set the generation signal classification of the dialer 233 upon power failure (S63).

Further, the photosensing side of the photocoupler 241 is also made nonconductive. The gate terminal of the FET 240 is set to a high impedance state and the FET 240 is turned on. Thus, the PB dial signal which is generated from the dialer 233 can be inputted to the speech network 234. The transmission of the selection signal by the PB dial signal to the external line 102 can be performed (S64).

Figure 8:
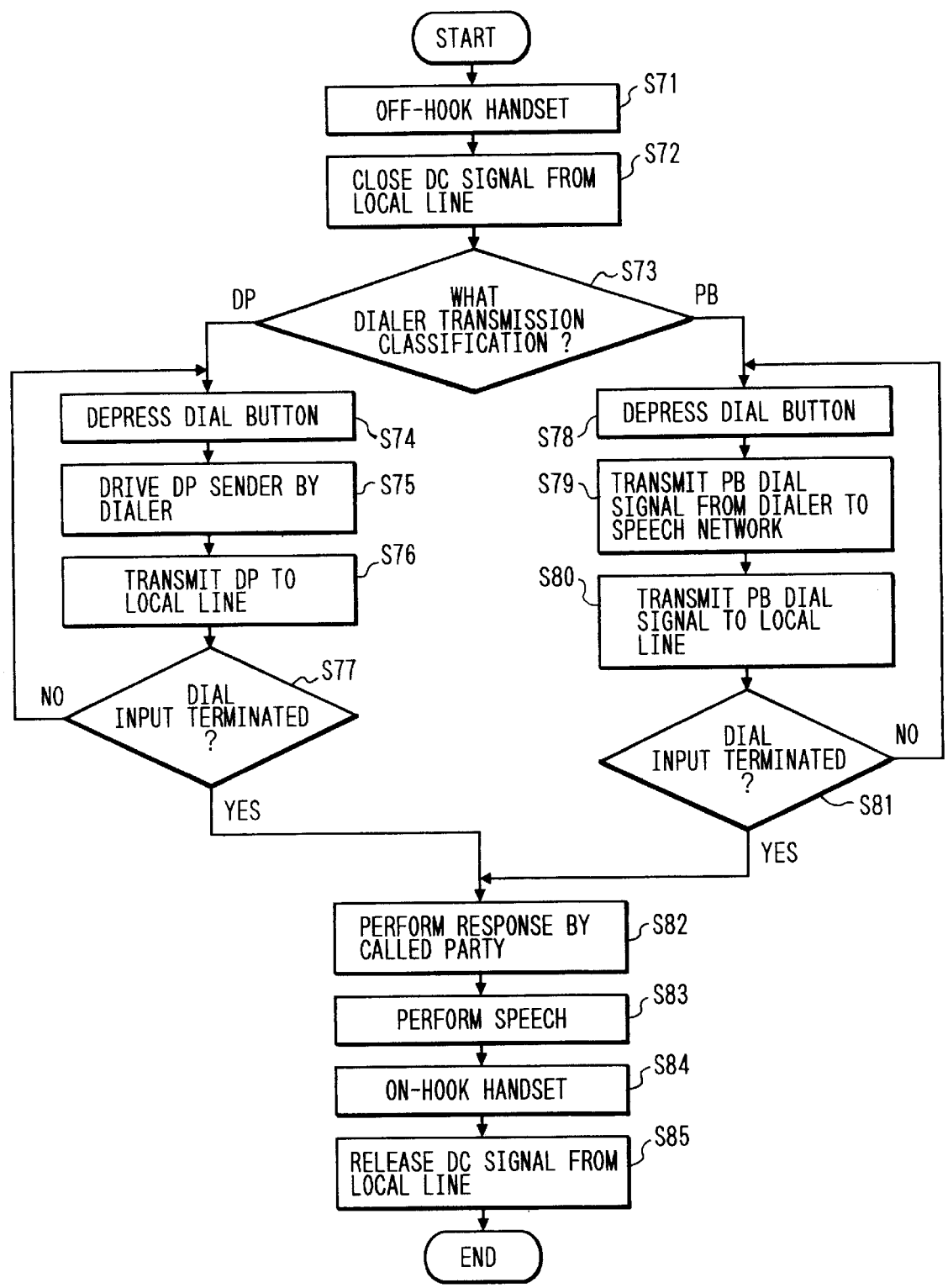
FIG. 8 is a flowchart showing the dial transmitting operation of the telephone unit at the time of a power failure in the first embodiment.

FIG. 8 is a flowchart showing the operation of the dial transmission of the telephone unit 231 upon power failure.

When the operator off-hooks the handset 246 (S71), the DC signal from the external line 102 is closed by the speech network 234 (S72). The current is supplied to the dialer 233.

The signal classification which is generated from the dialer 233 is set by the mechanical switch 238 (S73). When the mechanical switch 238 has been set to the DP dial signal, by depressing the dial button 235 by the operator (S74), the selection signal by the DP dial signal is transmitted from the DP sender 245 which is controlled by the dialer 233 to the external line 102 (S75, S76).

In the case where the mechanical switch 238 is set to the PB dial signal, by depressing the dial button 235 by the operator (S78), the PB dial signal is transmitted from the dialer 233 and the selection signal by the PB dial signal is transmitted to the external line 102 via the speech network 234 (S79, S80).

After the transmission of the selection signal to the external line 102 was finished, the system is shifted to the speech state (S83) by a response by the called party (S82). When the speech is finished, the operator on-hooks the handset 246 (S84), so that the DC signal from the external line 102 is released (S85).

In the above embodiment, although the telephone unit 231 has been enclosed in the casing of the main apparatus 201, they can be constructed by different casings.

In the embodiment, the SLT interface 221 to supply the DC signal to the telephone unit 231 upon current supply has been used only for the telephone unit 231. However, it is also possible to lead out the signal line from the SLT interface 221 to the outside of the casing and to branch connect a commercially available single line telephone to the telephone unit 231.

In the above embodiment, all of the exclusive-use telephones which are connected to the main apparatus have been connected in a wireless manner. However, the invention can be also applied to a telephone exchange including an exclusive-use telephone which is connected by a wire, a commercially available facsimile apparatus, and an auto answer phone.

In the embodiment, further, on the signal line from the dialer 233 of the telephone unit 231 to the PB receiver 210, the transformer 239 has been used to keep an insulation between both of them. However, the invention is also effective in a system constructed by using a photoelectric converting IC such as a photocoupler or the like. Although the PB receiver has been used in the above embodiment, a DP detector can be also used.

Figure 9:
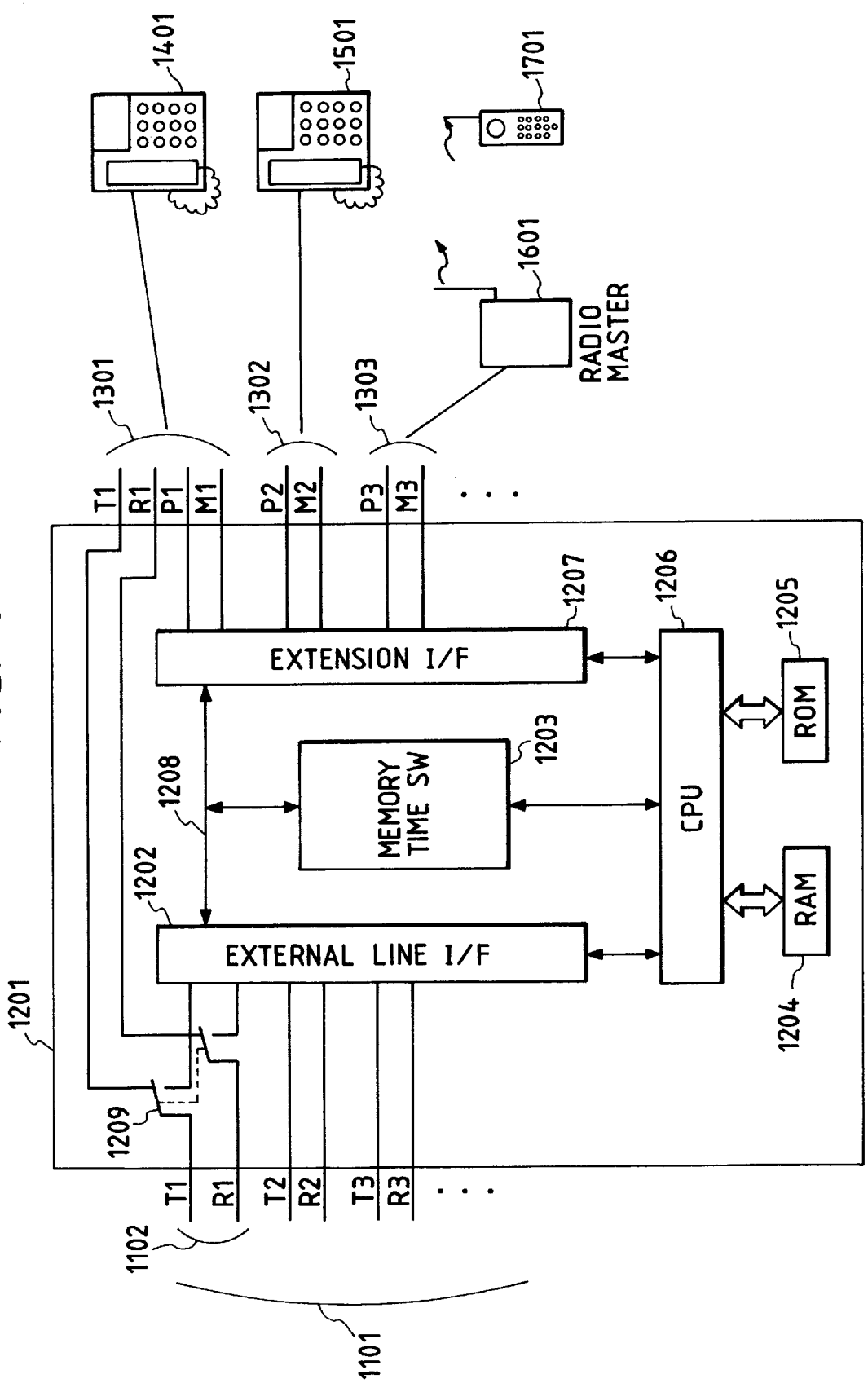
FIG. 9 is a block diagram showing a construction of a telephone exchange in the second embodiment of the invention.

The second embodiment of the invention will now be described. FIG. 9 is a block diagram showing a construction of a telephone exchange in the second embodiment.

The telephone exchange is constructed by: a main apparatus 1201 which encloses a plurality of external lines 1101 such as local lines, external lines, extensions of a PBX, etc. and has an exchange unit; exclusive-use telephones 1401 and 1501 which are connected to the extensions by wires; a radio master 1601 which is connected to the extension by a wire; and a radio slave 1701 which is connected to the extension through the master 1601 in a wireless manner. The main apparatus 1201 of the telephone exchange has: an external line interface 1202; an extension interface 1207; a high speed signal line PCM highway 1208 for a digital encoded audio signal; a memory time switch 1203 to perform an exchange connection of the digital encoded audio signal; an RAM 1204 as a readable/writable memory device; an ROM 1205 as a read only memory device; a CPU 1206 to control the operation of the whole telephone exchange; and a relay 1209 for connecting external lines 1102 (T1, R1) to the external line interface 1202 at the time of a current supply and for connecting the external lines 1102 and the exclusive-use telephone 1401 corresponding to a power failure at the time of a power failure. In a manner similar to the foregoing embodiment, a commercially available facsimile apparatus, an auto answer phone, etc. can be also connected to the extension interface 1207.

Figure 10B:
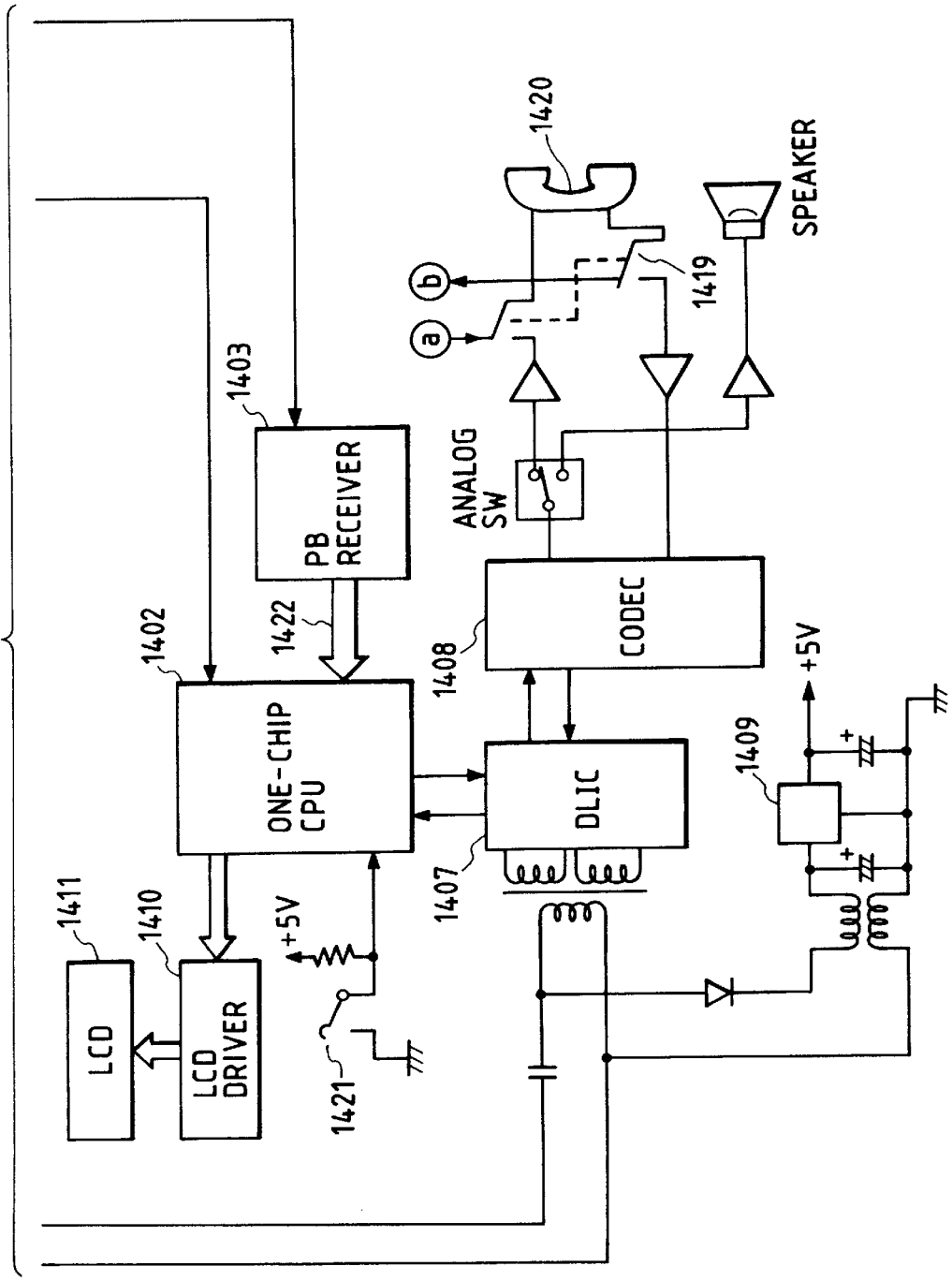
FIG. 10 which is comprised of FIGS. 10A and 10B is a block diagram showing in detail a construction of an exclusive-use telephone corresponding to a power failure in the second embodiment.

FIGS. 10A and 10B are block diagrams showing in detail a construction of the exclusive-use telephone 1401 corresponding to the power failure shown in FIG. 9.

The telephone 1401 has: a dial button 1417 of one contact; a dialer 1404 for generating a selection signal by a PB dial signal or DP signal in accordance with the depression of the dial button 1417; a PB receiver 1403 for receiving the PB dial signal from the dialer 1404 and decoding a dial number; a CPU 1402 for inputting dial information from the PB receiver 1403; and a DLIC (digital signal transmitting circuit) 1407 for communicating with the CPU 1402 and transmitting the dial information to the main apparatus 1201. The DLIC 1407 time-divisionally communicates an input audio signal from a handset 1420, an output audio signal to the handset 1420 or a speaker, a display output signal to a liquid crystal display 1411, and control input signals from the PB receiver 1403, a hook detection circuit 1421, and an external line button 1418. The telephone 1401 also has: a CODEC 1408 for communicating a PCM signal with the DLIC 1407 and encoding and decoding to an analog signal; the handset 1420 for a speech connected to the CODEC 1408; the hook detection circuit 1421 for detecting an on-hook and off-hook of the handset 1420 and notifying to the CPU 1402; a power supply unit 1412 for making a relay 1413 operative and supplying an electric power to the dialer 1404 at the time of a current supply; a power IC 1409 for converting an electric power that is supplied from the main apparatus 1201 to +5 V at the time of a current supply; the external line button 1418 which is depressed when an external line is captured upon current supply; an LCD driver 1410 which is controlled by the CPU 1402; and the liquid crystal display 1411 which is controlled by the driver 1410 and displays various information.

Further, the telephone 1401 has: a speech network 1405 for closing a direct currents from the external lines 1102 (T1, R1) upon power failure and controlling the transmission and reception of the audio signal; a mechanical switch 1416 to set a generation signal classification of the dialer 1404 upon power failure; a photocoupler 1415 to set the generation signal classification of the dialer 1404 to the PB dial irrespective of a state of the mechanical switch 1416 upon current supply; a transformer 1414 to transmit the PB dial signal while keeping an insulation between the dialer 1404 and the PB receiver 1403 upon power failure; a DP sender 1406 which is controlled by the dialer 1404 upon power failure and sends a dial pulse to the external lines 1102; and a relay 1419 for connecting the handset 1420 to the CODEC 1408 at the time of a current supply and for connecting to the speech network 1405 at the time of a power failure.

Figure 11:
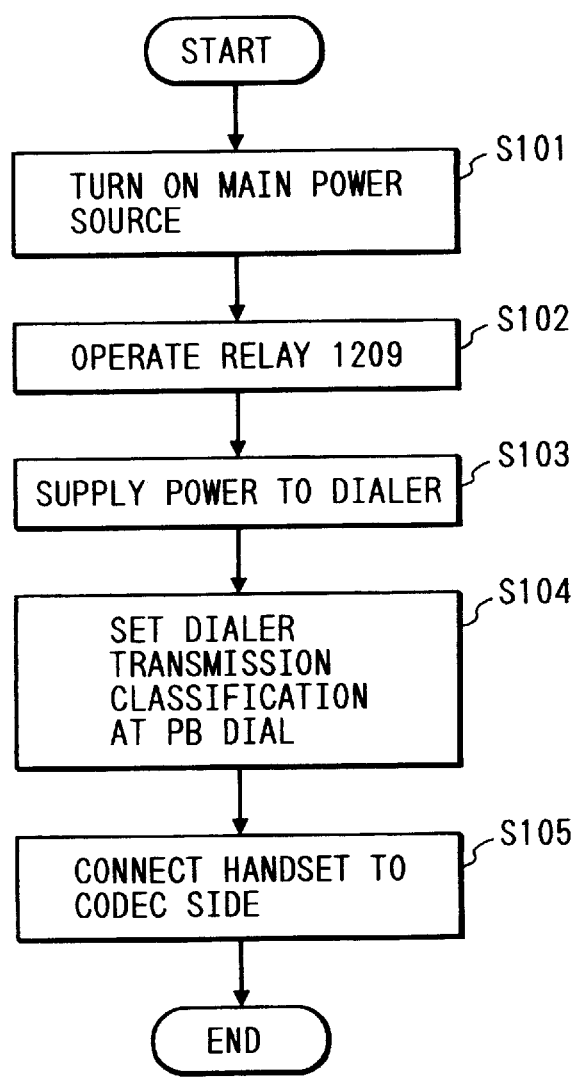
FIG. 11 is a flowchart showing the operations of a main apparatus and the exclusive-use telephone corresponding to the power failure at the time of a turn-on of a main power source in the second embodiment.

FIG. 11 is a flowchart showing the operations of the main apparatus 1201 and the exclusive-use telephone 1401 corresponding to the power failure when a main power source of the telephone exchange is turned on.

When the main power source is turned on (S101), a current flows to a coil of the relay 1209, a contact operates, and the external lines 1102 (T1, R1) are connected to the external line interface 1202 (S102).

Further, since an electric power is supplied from the main apparatus 1201 to the power IC 1409 in FIG. 10B, +5 V is supplied to the exclusive-use telephone 1401 corresponding to the power failure. By supplying +5 V, the relay 1413 is made operative and a current is supplied to the dialer 1404 through the speech network 1405 (S103).

Since the photosensing side of the photocoupler 1415 is made conductive by the supply of +5 V, the generation signal classification of the dialer 1404 is set to the PB dial irrespective of the state of the mechanical switch 1416 to set the generation signal classification of the dialer 1404 upon power failure (S104). Further, by the supply of +5 V, the relay 1419 operates, thereby connecting the handset 1420 to the CODEC 1408 side (S105).

Figure 12:
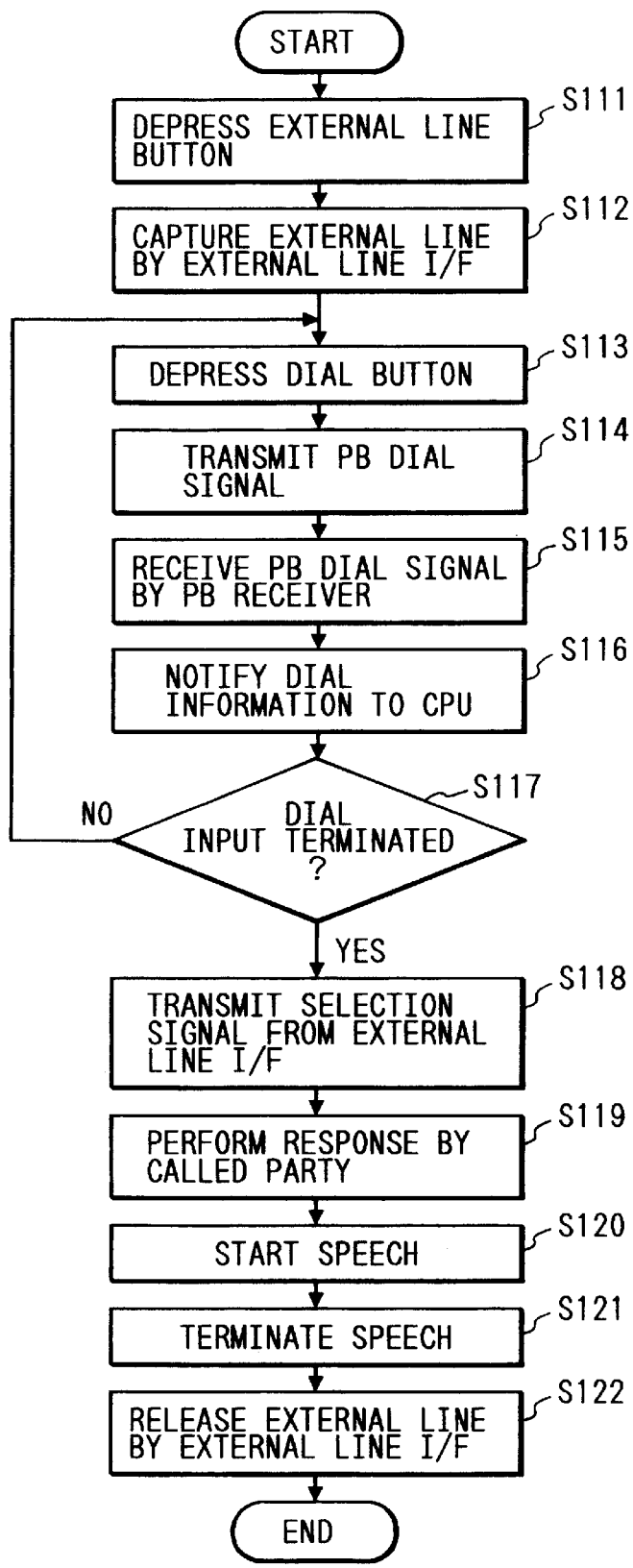
FIG. 12 is a flowchart showing the operation of a dial transmission of the exclusive-use telephone corresponding to the power failure at the time of a current supply in the second embodiment.

FIG. 12 is a flowchart showing the operation of the dial transmission of the exclusive-use telephone 1401 corresponding to the power failure upon current supply.

First, when the operator depresses an arbitrary external line button 1418 or off-hooks the handset 1420 (S111), such information is transmitted to the CPU 1206 of the main apparatus 1201 by the CPU 1402 and the external line designated by the external line interface 1202 is captured (S112).

By subsequently depressing the dial button 1417 by the operator (S113), the PB dial signal is transmitted from the dialer 1404 (S114) and is received by the PB receiver 1403 via the transformer 1414 (S115). Thus, the PB receiver 1403 decodes the dial number depressed by the operator from the PB dial signal and notifies to the CPU 1402 (S116).

When the dial number input by the operator is finished (S117), the dial number is notified to the CPU 1206 of the main apparatus 1201 from the CPU 1402. The CPU 1206 transmits a selection signal from the external line interface 1202 to the external line 1102 in accordance with the dial number (S118). The external line interface 1202 has a circuit to transmit a dial pulse or PB signal to the external lines 1101. Information indicating whether the dial pulse is transmitted or the PB signal is transmitted has previously been registered in the RAM 1204. After that, the telephone 1401 is connected to the called party via the extension interface 1207 and memory time switch 1203 in accordance with a response of the called party and the system is shifted to a speech state (S119, S120). At the time of a current supply, an extension speech can be also performed from the telephone 1401.

When the speech is finished (S121), by on-hooking the handset 1420 by the operator, the external line interface 1202 releases the external line (S122).

FIG. 13 is a flowchart showing the operations of the main apparatus 1201 and the exclusive-use telephone 1401 corresponding to the power failure when a power failure occurs and the power source to the telephone exchange is shut off.

When the power source is shut off (S131), the relay 1209 is released (S132), thereby directly connecting the external line 1102 to the exclusive-use telephone 1401. Since +5 V in the telephone 1401 in FIGS. 10A and 10B is not supplied, the current supply from the power supply unit 1412 to the dialer 1404 is stopped (S133).

Since the relay 1413 is released, the circuit for the power failure and the power source circuit upon current supply are insulated. Further, since the photosensing side of the photocoupler 1415 is made nonconductive, the generation signal classification of the dialer 1404 is set by the mechanical switch 1416 to set the generation signal classification of the dialer 1404 at the time of the power failure (S134).

Since the relay 1419 is released, the handset 1420 is connected to the speech network 1405 for the power failure (S135).

In the second embodiment, the dial transmitting operation of the exclusive-use telephone 1401 corresponding to the power failure at the time of the power failure is executed in accordance with the flowchart of FIG. 8 described in the first embodiment.

By off-hooking the handset 1420 by the operator (S71), the DC signal from the external line 1102 is closed by the speech network 1405 (S72) and a current is supplied to the dialer 1404.

The signal classification which is generated from the dialer 1404 is set by the mechanical switch 1416 (S73). When the mechanical switch 1416 has been set to the DP dial signal, by depressing the dial button 1417 by the operator (S74), the selection signal by the DP dial signal is transmitted to the external lines 1102 from the DP sender 1406 that is controlled by the dialer 1404 (S75, S76).

When the mechanical switch 1416 has been set to the PB dial signal, by depressing the dial button 1417 by the operator (S78), the PB dial signal is transmitted from the dialer 1404 and the selection signal by the PB dial signal is transmitted to the external line 1102 via the speech network 1405 (S79, S80).

After the transmission of the selection signal to the external line 1102 was finished, the system is shifted to the speech state (S83) by the response of the called party (S82). When the speech is finished, the operator on-hooks the handset 1420 (S84), so that the DC signal from the external line 1102 is released (S85).

In the above embodiment, although the main apparatus 1201 and the exclusive-use telephone 1401 corresponding to the power failure has been constructed by different casings, the telephone 1401 can be also enclosed in the main apparatus 1201.

In the embodiment, on the signal line from the dialer 1404 of the exclusive-use telephone 1401 to the PB receiver 1403, the transformer 1414 has been used to keep an insulation between both of them. However, a photoelectric converting IC such as a photocoupler or the like can be also used.

In the embodiment, since the audio signal and control signal have been transmitted as digital signals between the main apparatus 1201 and the exclusive-use telephone 1401 corresponding to the power failure, it is necessary to convert the audio signal to the analog signal by the CODEC 1408 at the time of the current supply. However, it is also possible to transmit the audio signal and control signal by analog signals between the main apparatus 1201 and the telephone 1401 and to use the CODEC 1408 and DLIC 1407.

In the above embodiment, although the PB receiver has been used, a DP detector can be also used. The present invention is not limited to the foregoing embodiments but many modifications and variations are possible within the spirit and scope of the appended claims of the invention.

What is claimed is:

1. A communication system for connecting a terminal through a communication channel for a communication signal and a control channel for a control signal, comprising:
    first setting means for setting a kind of dial signal which is generated from said terminal at the time of a power failure;
    second setting means for setting a kind of dial signal so that said terminal generates a predetermined kind of dial signal at the time of a current supply;
    decoding means for decoding the predetermined kind of the dial signal which is generated from said terminal; and
    transmitting means for transmitting a dial signal according to an output of said decoding means, to an external line at the time of a current supply,
    wherein when a power failure occurs, the dial signal of the kind set by said first setting means, that is generated from said terminal is transmitted to said external line without passing through said decoding means.

2. A system according to claim 1, further comprising means for supplying a current to dial signal generating means provided for said terminal when said terminal is in an off-hook state.

3. A system according to claim 1, further comprising means for setting control data for said communication system in accordance with the output of said decoding means.

4. A system according to claim 1, wherein said decoding means decodes a push button signal.

5. A system according to claim 4, wherein said second setting means sets the kind of dial signal so that said terminal generates a push button signal irrespective of a setting by said first setting means.

6. A system according to claim 1, further comprising means for blocking that the dial signal that is generated from said terminal is transmitted to said communication channel at the time of the current supply.

7. A system according to claim 1, further comprising means for encoding or decoding the communication signal on said communication channel at the time of the current supply.

8. A system according to claim 1, wherein said transmitting means receives the output of said decoding means through said control channel.

9. A communication system for connecting a terminal through a communication channel for a communication signal and a control channel for said control signal, comprising:
    a dialer for generating a push button signal at the time of a current supply;
    a switch for selecting a kind of dial signal to be generated from said dialer when a power failure occurs, out of the push button signal and a dial pulse signal;
    a receiver for receiving the push button signal generated from said dialer; and
    an external line interface for transmitting a dial signal according to an output of said receiver received through said control channel, to an external line at the time of a current supply,
    wherein when a power failure occurs, the dial signal of the kind selected by said switch, generated from said dialer is transmitted to said external line without passing through said receiver.

10. A system according to claim 9, wherein said dialer can generate a push button signal or a dial pulse signal.

11. A system according to claim 9, wherein said external line interface transmits the push button signal or dial pulse signal to said external line in accordance with the setting by said switch.

12. A system according to claim 9, wherein said dialer generates the push button signal irrespective of the setting of said switch.

13. A system according to claim 9, further comprising means for supplying a current to said dialer when said terminal is in an off-hook state.

14. A system according to claim 9, further comprising means for setting control data for said communication system in accordance with the output of said receiver.

15. A system according to claim 9, further comprising means for blocking that the push button signal generated from said dialer is transmitted to said communication channel at the time of the current supply.

16. A system according to claim 9, further comprising means for encoding or decoding the communication signal on said communication channel at the time of the current supply.

17. A communication apparatus which is connected to an external line through a private network, comprising:
    generating means for generating a dial signal;
    first setting means for setting a kind of dial signal that is generated from said generating means during a power failure;
    second setting means for setting a kind of dial signal so that said generating means generates a push button signal irrespective of a setting by said first setting means during a current supply;
    decoding means for decoding the push button signal generated by said generating means;
    first transmitting means for transmitting an output of said decoding means to a controller of said private network; and
    second transmitting means for transmitting the dial signal of the kind set by said first setting means, generated from said generating means to said external line without passing through said controller at the time of a power failure.

18. A system according to claim 17, further comprising means for supplying a current to said generating means in an off-hook state.

19. A system according to claim 17, wherein said decoding means decodes a push button signal.

20. A communication apparatus comprising:

dialing means for generating a dial signal;

selecting means for selecting dial signals out of a push button signal and a dial pulse signal, and outputting a selection output representing selected dial signals; and setting means for setting a state of the selection output in a case of power supply, wherein said dialing means generates the dial signals selected by said selecting means in a case of power failure, and generates the dial signals dependent upon the state of the selection output set by said setting means and independent from the dial signals selected by said selecting means in the case of power supply.

21. An apparatus according to claim 20, wherein said setting means sets the state of the selection output such that the push button signal is generated for the time of power supply irrespective of a kind of the dial signal for the time of power failure.

22. An apparatus according to claim 20, further comprising:

detecting means for detecting the dial signal from said dialing means;

first transmitting means for transmitting an output of said detecting means to a controller of a private network; and second transmitting means for transmitting the dial signal from said dialing means to an external line of the private network without through the controller at the time of a power failure.

23. An apparatus according to claim 20, further comprising:

communicating means for communicating with a communication partner via a communication channel; and blocking means for blocking that the dial signal is transmitted to the communication channel at the time of current supply.

24. A communication system comprising:

dialing means for generating a dial signal;

selecting means for selecting dial signals out of a push button signal and a dial pulse signal, for the time of power supply and for the time of power failure independently;

internal network for connecting communicating means to an external line;

detecting means for detecting the dial signal from said dialing means;

transmitting means for transmitting a dial signal to the external line according to an output of said detecting means; and connecting means for connecting said dialing means to the external line without passing through said internal network at the time of power failure.

25. A system according to claim 24, wherein said selecting means selects the push button signal for the time of power supply irrespective of a kind of the dial signal for the time of power failure.

26. A system according to claim 24, wherein said transmitting means transmits the dial signal of a kind selected by said selecting means for the time of power supply.

27. A system according to claim 24, further comprising:

communicating means for communicating with a communication partner via a communication channel; and blocking means for blocking that the dial signal is transmitted to the communication channel at the time of current supply.

28. A system according to claim 24, further comprising setting means for setting control data for the communication system in accordance with an output of said detecting means.

29. A control method for a dialer, comprising the steps of:

inputting a selecting output from a switch for selecting a dial signal of the dialer out of a push button signal and a dial pulse signal;

setting a state of the selection output during power supply;

generating the dial signal dependent upon the selection output from the switch for selecting the dial signal during power failure; and generating the dial signal dependent upon the selection output set in said setting step during the power supply and independent from the switch for selecting the dial signal.

30. A method according to claim 29, wherein the state of the selection output is set such that the push button signal is generated during the power supply in said setting step.

31. A method according to claim 29, further comprising the steps of:

detecting the dial signal;

transmitting a detecting result of said detecting step to a controller of a private network; and transmitting the dial signal to an external line of the private network without through the controller at the time of power failure.

32. A method according to claim 29, further comprising the steps of:

communicating with a communication partner via a communication channel; and blocking that the dial signal is transmitted to the communication channel at the time of current supply.

33. A method according to claim 29, wherein in said setting step the state of the selection output is set according to an output of a photocoupler.

34. An apparatus according to claim 20, wherein said setting means has a photocoupler for setting the state of the selection output.

* * * * *